United States Patent Office 3,194,758
Patented July 13, 1965

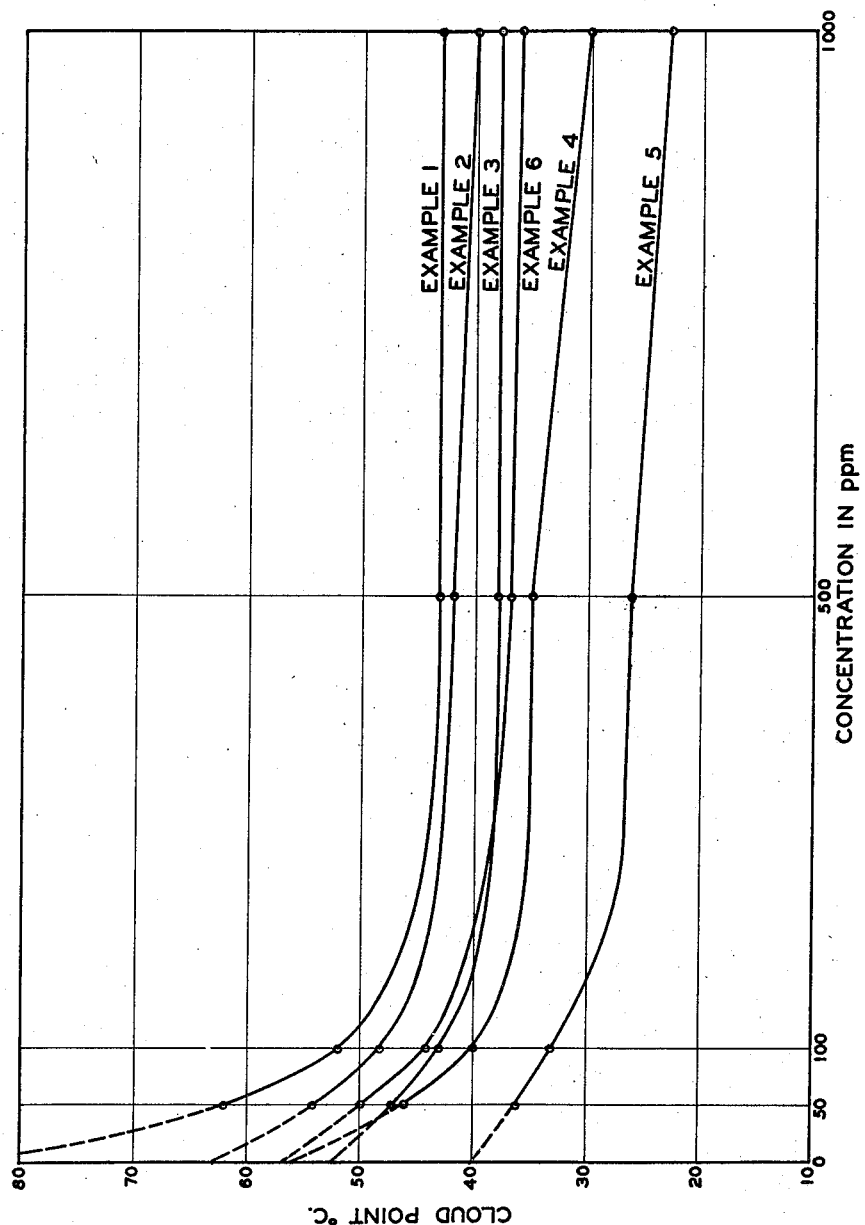

3,194,758
METHOD OF AGGLOMERATING FINELY DIVIDED SOLIDS IN AN AQUEOUS MEDIUM
Kenneth J. Lissant, St. Louis, Mo., assignor to Petrolite Corporation, Wilmington, Del., a corporation of Delaware
Filed May 24, 1961, Ser. No. 123,604
12 Claims. (Cl. 210—54)

This invention relates to a method of agglomerating and agglomerating and removing finely divided solids from a liquid medium.

There are many instances where it is desirable to remove finely divided solids from a liquid medium. This is particularly true of industrial wastes which are allowed to flow into streams. The present day emphasis on the conservation of water as a natural resource coupled with the necessity of avoiding stream pollution makes it highly desirable to remove finely divided solids from industrial wastes so that water can be reused or, if disposed of, can be allowed to flow into streams without polluting them.

I have now discovered a method of removing finely divided solids from a liquid medium which is characterized by (1) dissolving an oxyalkylated surfactant in a finely divided solid-liquid system, (2) causing the surfactant to become insoluble therein so that the finely divided solids are agglomerated therein, (3) removing the agglomerated finely divided particles from the liquid by conventional methods such as settling, filtration, centrifugation, etc.

This invention employs, among other things, the phenomenon of the inverse solubility of oxyalkylated surfactants, i.e. oxyalkylated surfactants are more soluble at low temperatures than at high temperatures so that when a soltuion of an oxyalkyllated surfactant is heated to a certain temperature, or above, it comes out of solution. The temperature at which the surfactant first comes out of solution in sufficient amounts to cause a haze is called its "cloud point." I have discovered that at or above the cloud point, certain surfactants have the property of agglomerating finely divided solids. This result is unexpected since oxyalkylated surfactants have heretofore been employed to increase the stability of dispersions of finely divided solids in a liquid medium rather than to cause their agglomeration.

Many different oxyalkylated surfactants can be employed in this invention. However, an effective surfactant for a particular system depends on many factors, for example, the solid to be removed, the temperature at which the system is operated, impurities present, etc.

As is well known, alkylene oxides can be reacted with various oxyalkylatable materials (i.e. materials which contain a reactive hydrogen atom capable of reacting with a 1,2 alkylene oxide) to form polyalkylene oxide derivatives thereof. Thus, where an oxyalkylatable material of the formula $ZH_z$ is reacted with an alkylene oxide such as ethylene oxide, there is obtained a compound of the formula

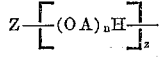

such as

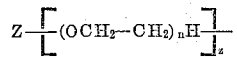

where $n$ is a number determined by the moles of alkylene oxide reacted and $z$ is a number determined by the compound's oxyalkylatable hydrogens.

Many polyakylene oxide block polymers have been prepared containing definite homogeneous block units or segments of ethylene oxide, propylene oxide, butylene oxide, etc., such as disclosed in U.S.P. 2,674,619, 2,677,700 and elsewhere.

Where ethylene oxide is reacted with water, a polymeric polyethylene glycol of the type $$H(OEt)_n—O—(EtO)_nH$$

is formed. Similarly, where propylene oxide is reacted with water, a polymeric polypropylene glycol of the type $H(OPr)_n—O—(PrO)_nH$ is formed. When water is first reacted with ethylene oxide followed by reaction with propylene oxide, a polymer containing blocks of ethylene oxide units and blocks of propylene oxide are formed, $H(OPr)_m(OEt)_nO—(EtO)_n(PrO)_mH$, or when added in the reverse order the following block polymer is formed:

$$H(OEt)_m(OPr)_nO(PrO)_n(EtO)_mH$$

Block polymers of this type can be formed by adding infinite numbers of block units, for example,

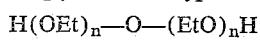
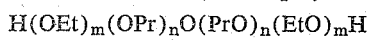

This block-wise or sequential addition could be continued infinitely. Since only two types of alkylene oxides are employed, these polymers are di-block polymers.

Where three or more different types of alkylene oxides are employed, ter-block polymers are formed as illustrated by sequentially adding ethylene oxide, propylene oxides, and butylene oxides to water to form:

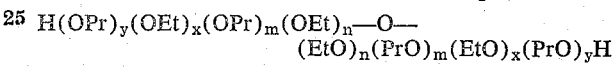

There ter-block units may also be continued infinitely. Where, for example, other alkylene oxides are used in addition to ethylene, propylene, and butylene oxides, a higher type of block polymer is formed, such as when octylene oxide or styrene oxide are additionally reacted. It is to be noted the block units of these polymers within themselves are homogeneous units, i.e., each block is derived from a single alkylene oxide.

Polyalkylene oxides have also been prepared by reacting mixtures of alkylene oxide such as when a mixture of ethylene oxide and propylene oxide are reacted. When this is done, a random or hetero-polymer is obtained as contrasted to the homo-block polymer previously described. Thus, for example, where a 50/50 molar mixture of EtO and PrO are reacted with an oxyalkylatable material, such as water, one obtains a polymer having no orderly arrangement of the alkylene oxide units since the distribution of EtO and PrO units in the molecule is random may be designated by

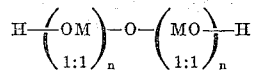

where MO represents a random distribution of EtO and PrO units such as, for example,

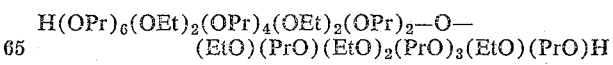

Carbide & Carbon sells these mixed glycols under the "Ucon" trademark.

The alkylene oxides employed in preparing the compounds employed in this invention are 1,2-alkylene oxides of the formula:

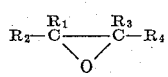

wherein $R_1$, $R_2$, $R_3$, and $R_4$ are selected from the group consisting of hydrogen, an aliphatic, cycloaliphatic, aryl, etc. group for example ethylene oxide, propylene oxide, butylene oxide, amylene oxide, octylene oxide, styrene oxide. The preferable oxides are ethylene and propylene oxides.

Equivalents of alkylene oxides can also be employed, for example alkylene carbonates, i.e. ethylene carbonate, propylene carbonate, butylene carbonate, etc. In addition, alkylene oxides of the glycide, methyl glycide type can also be employed.

The term "reactive hydrogen atom" is well-known and clearly understood by those skilled in the art. However, to remove any possible ambiguity in this regard the term reactive hydrogen atom, as used herein includes any oxyalkylatable hydrogen atom (i.e., a hydrogen atom sufficiently labile to open the epoxide ring of an alkylene oxide).

The reactive hydrogen atom is normally activated so as to be oxyalkylatable by being a member of a functional group containing an oxygen atom, eg. a hydroxyl group, a phenol group, a carboxylic acid group; a basic nitrogen atom, e.g. an amine group, a hydrazine group, an imine group, an amide group, a guanidine group, a sulfonamide group, a urea group, a thiourea group; or a sulfur atom, e.g. a mercaptan, a thiophenol, a thiocarboxylic acid, hydrogen sulfide. Alternatively, certain hydrogen atoms may be activated by proximity to other functional groups, for example, carbonyl groups such as those found in cyanoacetic esters, acetoacetic esters, malonic esters, etc.

Specific examples of base compounds which may be used include water, ethylene glycol, 1,3 butylene glycol, oxalic acid, glycolic acid, mono-, di-, and triethanolamine, butylamine, aniline, resorcinol, diethylmalonate, etc.

Also included are the following:

Aliphatic alcohols such as methanol, ethanol, propanol, isopropanol, butanol, secondary butanol, tertiary butanol, n-amyl alcohol, the monomethyl ether of ethylene glycol, the monomethyl ether of diethylene glycol, 2-chloroethanol, etc.

Aliphatic carboxylic acids such as formic acid, acetic acid, mono-, di- and tri-chloroacetic acid, propanoic acid, butenoic acid, pentanoic acid, etc.

Aliphatic amines such as dimethylamine, diethylamine, dipropylamine, dibutylamine, N-methylethylamine, N-ethyl-propylamine, etc.

N-substituted aliphatic carboxylic acid amides such as N-methyl formamide, N-methyl acetamide, N-ethyl butanoic acid amide, N-butyl propanoic acid amide, N-methyl pentanoic acid amide, etc.

N-substituted aliphatic sulfonamides such as N-methyl ethane sulfonamide, N-ethyl propane sulfonamide, N-methyl butane sulfonamide, N-propyl pentane sulfonamide, etc.

Aliphatic mercaptans such as methyl mercaptan, ethyl mercaptan, propyl mercaptan, tertiary butyl mercaptan, isobutyl mercaptan, amyl mercaptan, etc.

The following contains higher molecular weight of the above as well as aromatic derivatives thereof.

Aliphatic and aromatic hydroxyl compounds such as hexanol, lauryl alcohol, phenol, ortho-, meta-, and para-creosol, chlorophenol, alpha-, and beta-naphthol, nonyl phenol, etc.

Aliphatic and aromatic carboxylic acids such as hexanoic acid, oleic acid, stearic acid, benzoic acid, ortho-, meta- and para-toluic acid, alpha- and beta-naphthoic acid, etc.

Polyamines such as those of the formula

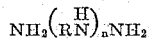

such as ethylene diamine, diethylene triamine, triethylene pentamine, corresponding propylene derivatives, etc.

Amines such as dihexylamine, N-methyl stearylamine, N-methyl aniline, phenyl-beta-naphthylamine, etc.

N-substituted carboxylic acid amides such as N-methyl lauric acid amide, N-ethyl-benzoic acid amide, etc.

N-substituted sulfonamides such as N-ethyl benzenesulfonamide, N-phenyl toluenesulfonamide, etc.

Aliphatic and aromatic mercaptans such as dodecyl mercaptan, thiophenol, thiocresol, alpha- and beta-thionaphthol, etc.

Any of the active hydrogen compounds set forth above may include substituents which do not contain hydrogen atoms capable of reacting with 1,2 alkylene oxides, e.g. Cl, Br, I, —$NO_3$ alkoxy radicals, etc.

The following is a non-limiting list of base materials having more than one oxyalkylatable hydrogen.

(A)

Polyhydric alcohols
Ethylene glycol
Propylene glycol
Diethylene glycol
Trimethylene glycol
2,3-butanediol
1,4-dihydroxy-2-butene
1,12-dihydroxy octadecane
1,4-dihydroxy cyclohexane
2,2-dimethyl-1,3-propanediol
2-ethyl-2-butyl propanediol-1,3
Glycerol
Erythritol
Sorbitol
Mannitol
Inositol
Trimethylol propane
Pentaerythritol
Polyallyl alcohol
Bis (4-hydroxycyclohexyl) dimethyl methane
1,4-dimethylol benzene
4,4'-dimethylol diphenyl
Dimethylol xylenes
Dimethylol naphthalenes, etc.

(B)

Polyhydric ether alcohols
Diglycerol
Triglycerol
Dipentaerythritol
Tripentaerythritol
Dimethylolanisoles
Beta hydroxyethyl ethers of polyhydric alcohols and phenols, such as
    Diethylene glycol
    Polyethylene glycols
Bis(beta hydroxyethyl ether) of hydroquinone
Bis(beta hydroxyethyl ether) of bisphenol
Beta hydroxyethyl ethers of glycerol, pentaerythritol, sorbitol, mannitol, etc.
Condensates of alkylene oxides such as ethylene oxide; propylene oxide; butylene oxide; isobutylene oxide; glycidol; epichlorhydrin; glycid ethers, etc. with polyhydric alcohols such as the foregoing and with polyhydric thioether alcohols such as
    2,2'-dihydroxy diethyl sulfide
    2,2',3,3'-tetrahydroxy dipropyl sulfide
    2,2',3-trihydroxy-3'-chlordipropyl sulfide (C)

Hydroxy-aldehydes and -ketones
Dextrose
Fructose
Maltose
Glyceraldehyde (D)

Mercapto (thiol) alcohols
2-mercapto ethanol
Alpha monothioglycerol (E)

Polyhydric phenols
Hydroquinone
Resorcinol
Pyrogallol
Bisphenol (predominantly 4,4'-dihydroxy diphenyl dimethyl methane)
Dihydroxy diaryl sulfones (F)

Hydroxy esters
Monoglycerides, such as monostearin
Ethylene glycol dilactate
Mono esters of pentaerythritol, e.g. a monoacetate (G)

Halogenated alcohols (halohydrins)
Glycerol monochlorhydrins
1,4-dichloro-2,3-hydroxy butane
Monochloride of pentaerythritol (H)

Phenol-aldehyde resins
See U.S.P. 2,499,365

The molecular weight of the surfactants of this invention can vary widely from such as 500 to 100,000, or higher, for example, a range of 1,000 to 25,000, preferably 1,500–7,000 with an optimum of 2,000–5,000. However, the specific preferred and optimum molecular weight will vary with each particular application.

The moles of alkylene oxide on each block unit can also vary widely, such as from 5–200 moles, or more, of alkylene oxide, for example, a range of 10–100 moles with an optimum of 15–60 moles per block unit. However, the range of the specific preferred block unit will vary with the specific surfactant molecule and with the system in which the surfactant is employed.

In general the surfactants which are most effective in the practice of this invention are those which contain more than one alkylene oxide, either in random distribution, in block formation or both. Where the surfactant is a block polymer, it is preferred that the terminal group be derived from a hydrophobe alkylene oxide, i.e. one other than EtO, preferably PrO. If the terminal block is derived from ethylene oxide, then the block so derived preferably should contain less alkylene oxide molar units than the immediately preceding hydrophobe alkylene oxide block.

The surfactant employed herein must possess the following attributes:

(1) It must have a cloud point in the selected temperature range and concentration employed in the system.

(2) It must agglomerate the finely divided solids from the liquid medium.

The fact that the sufractant satisfies (1) does not mean that it will necessarily satisfy (2) since the agglomeration function must also be present. However, by varying the number, sequential order, types and ratios of alkylene oxides, etc. on the surfactant molecule, substantially all surfactants satisfying (1) can be modified to agglomerate so as to satisfy (2). This is illustrated in Table II below where by adding additional moles of PrO to a surfactant, a surfactant slightly effective for agglomeration was converted to a surfactant very effective for agglomeration.

The following illustrates procedures for cloud point determination:

PROCEDURE I.—CLOUD POINT DETERMINATION

Transfer 2.50±0.01 gm. of the surfactant to a 500 ml. volumetric flask and dilute to the mark with distilled water. Stopper the flask and thoroughly mix the contents by inverting the flask several times. Introduce approximately 15 ml. of the dilution into a 20 by 150-mm. test tube. Place the tube in a hot water bath and stir the contents with a thermometer of suitable range, graduated in 0.2° C. units, and capable of being read easily to 0.1° C.

Observe and record as the cloud point the temperature at which haze first appears in the sample.

PROCEDURE II.—CLOUD POINT DETERMINATION

Weigh exactly 2.50±0.01 gm. of the sample into a 250-ml. glass-stoppered Erlenmeyer flask. Add 100 ml. of cold distilled water, stopper the flask, and place in a mechanical shaker for 30 minutes or until complete solution is effected. Transfer this sample solution to a 500-ml. glass-stoppered volumetric flask, rinsing the Erlenmeyer flask with portions of distilled water and adding these washings to the volumetric flask. Dilute to the mark with distilled water, stopper, and mix thoroughly.

Introduce approximately 15 ml. of the sample dilution into a 20 by 150-mm. test tube. Place the tube in a suitable cold water bath and heat slowly with a Bunsen burner or equivalent. Gently stir the contents of the tube with a thermometer graduated in 0.2° C. units and capable of being read easily to 0.1° C. Do not place the tube in boiling water.

Observe and record as the cloud point the temperature at which haze first appears in the sample.

Cloud points at other concentrations can be similarly determined.

It should be noted that the cloud point of a particular surfactant is a function of concentration and the cloud point of the surfactant at the use concentration is important. Since these surfactants are used at extremely low concentration, the determination of cloud point at use concentration is difficult. Therefore, in practice, the cloud point is determined at 50 p.p.m., 100 p.p.m., 500 p.p.m., 1000 p.p.m. and extrapolated to the lower concentrations to be employed as shown in FIGURE 1.

To illustrate the correlation between cloud point and agglomeration effectiveness, a series of surfactants of the same general composition but differing in cloud points were selected. The temperature at which each exhibited agglomeration was determined. In each case these surfactants were made by treating one part of dipropylene glycol with PrO then with EtO, then with PrO, in weight ratios indicated in Table I.

*Table I*

| Ex. | Parts by wt. and order of alkylene oxide added | | | Cloud point, ° C. | | Effectiveness in agglomerating finely divided solids from paper deinking plant effluent (50 p.p.m.) |
|---|---|---|---|---|---|---|
| | PrO | EtO | PrO | 100 p.p.m. | 50 p.p.m. | |
| 1 | 16 | 30 | 25 | 52 | 62 | Good agglomeration at 65° C. and above. |
| 2 | 16 | 30 | 35 | 48 | 54 | Good agglomeration at 55° C. and above. |
| 3 | 16 | 30 | 45 | 43 | 48 | Good agglomeration at 50° C. and above. |
| 4 | 16 | 30 | 55 | 40 | 46 | Good agglomeration at 46° C. and above. |
| 5 | 16 | 20 | 55 | 33 | 36 | Good agglomeration at 40° C. and above. |
| 6 | 16 | 20 | 35 | 44 | 50 | Good agglomeration at 55° C. and above. |

The cloud points of the surfactants of Table I are plotted against concentration in parts per million (p.p.m.). Their cloud points in aqueous solution at 1,000, 500, 100 and 50 p.p.m. are plotted as shown in FIGURE 1. The dotted lines in FIGURE 1 represent extrapolations of the cloud points of each compound to lower concentration. In practice, extrapolations to lower concentrations are made in this manner, particularly when very low concentrations are employed.

In a similar manner it was decided to select a material which would successfully agglomerate waste oil field water containing finely divided FeS at 30° C. A group of materials were selected, made by starting with a para-tertiary butyl phenol formaldehyde resin prepared in the manner of U.S. Patent 2,499,365 Ex. 1a and then reacting this resin with 15 parts by weight of PrO then 30.2 parts of EtO and finally with varying amounts of PrO.

The results of these tests are shown in the following Table II.

*Table II*

| Ex. | Final PrO | Cloud point, ° C. | | Effectiveness in flocculating finely divided solids of FeS from oil field water (50 p.p.m.) |
| --- | --- | --- | --- | --- |
| | | 100 p.p.m. | 50 p.p.m. | |
| 1 | 10.6 | 56 | 68 | Only slight agglomeration below 60° C. |
| 2 | 20.4 | 48 | 51 | Only slight agglomeration below 50° C. |
| 3 | 29.9 | 39 | 41 | Only slight agglomeration below 40° C. |
| 4 | 40.0 | 31 | 36 | Fair agglomeration at 35° C. |
| 5 | 50.2 | 27 | 30 | Excellent agglomeration at 30° C. |

After oxyalkylated surfactants have been screened for cloud points, they are tested for agglomeration effectiveness at economical concentrations. In general, tests for agglomeration are effected in the manner of the cloud point determination described above except that the finely divided solid-liquid system is employed in place of water. A minor amount of surfactant is added and the system heated and observed until agglomeration occurs. Although a wide range of surfactant concentrations can be employed, one must consider economic factors so that solid removal can be effected at the lowest cost. Although weight concentration of $1 \times 10^{-7}\%$ to 5% or more can be employed, in practice very small amounts of surfactant are effectively employed from 0.01 to 100 p.p.m., for example .05 to 50 p.p.m., but preferably 0.1 to 30, with an economic optimum of 1 to 15 p.p.m. Economic factors indicate as low a concentration as possible consistent with effectiveness. However, it should be understood that the effective concentration of surfactant will depend on many considerations such as the particular solid-liquid system, impurities, etc. Therefore, the surfactant is added in minor but effective amounts which are sufficient to agglomerate the solid particles present in the system.

In practice, a surfactant screened for the desired cloud point at the desired concentration range is added to test amounts of the solid-liquid system in five concentrations for example, (1) 1 p.p.m.; (2) 5 p.p.m.; (3) 10 p.p.m.; (4) 20 p.p.m.; (5) 50 p.p.m. Additional screening samples at other concentrations can also be employed.

The following examples will further illustrate the invention.

*Examples of Table III*

The effluent of a paper deinking plant contained finely divided solids that did not settle on standing even over a period of more than 15 days. This effluent was extremely difficult to filter even under vacuum since the particles were so fine they clogged the filter paper. More than two hours were required to filter small samples. This effluent was treated with the surfactants listed in the following table by adding the surfactant at room temperature, heating to 60° C. and holding at this temperature for 30 minutes. In contrast to the original effluent which took more than two hours to filter small amounts, the treated effluent was filtered in less than ten minutes with a denser cake, yielding a cleaner filtrate than resulted from the untreated filtered material.

Specifically, this effluent was tested in the following manner:

20 ml. of effluent was placed in each of several test tubes and 0.1 ml. of a 1% aqueous solution of the surfactant to be tested was added to the test tube and the tube was stoppered and shaken. The tubes were then held at increasingly higher temperature for periods of about ½ hour until agglomeration occurred. The following are typical examples of surfactants which cause agglomeration by this test at 60° C. at concentrations of 50 p.p.m.

*Table III*

Surfactant

| Ex. | Base compound for | Alkylene oxide added in the order given (weight ratios unless otherwise stated) |
| --- | --- | --- |
| 1 | Trishydroxyaminomethylmethane | 20 Pro<br>75 PrO/EtO (2:1)<br>22.3 PrO/EtO (1:1) |
| 2 | p-Tertiary-butyl phenol-formaldehyde resin (prepared in manner of U.S. Patent 2,499,365, Ex. 1a). | 12 PrO<br>15 PrO<br>12.3 EtO<br>25.4 PrO<br>5 EtO |
| 3 | Dipropylene glycol | 16 PrO<br>10 EtO<br>9.9 PrO<br>5.2 EtO<br>8.1 PrO |
| 4 | Dipropylene glycol | 16 PrO<br>17 EtO<br>18 PrO |
| 5 | p-Tertiarybutyl phenol-formaldehyde resin (prepared in manner as Ex. 2). | 15 PrO<br>30 EtO<br>50 PrO |
| 6 | Didodecyl phenol | 30 moles EtO<br>15 moles PrO |
| 7 | Nonyl phenol-formaldehyde resin (prepared in the manner of Ex. 2). | 30.3 PrO/EtO (2:1) |
| 8 | Tetraethylene glycol | 4 EtO<br>15 PrO<br>10 EtO<br>10 PrO<br>2 EtO |

The cloud points of the compounds of Table III were below 60° C. for 50 p.p.m.

Similar results were obtained by adding a solution of the above surfactants to the effluent which had already been heated above 60° C. A sufficient amount of the solution was added to yield an effluent containing a concentration equal to those of the above example, i.e. 50 p.p.m. Agglomeration occurred as soon as the added solution mixed with the heated effluent resulting in agglomeration as effectively as obtained above.

Certain of these surfacants also agglomerated successfully at lower concentrations. For example, the surfactant of Example 4 was similarly tested on a 500 ml. sample of the effluent at 10 p.p.m. at 60° C. and found to agglomerate equally effectively.

The above compounds were also effective on other fluid systems containing finely divided solids.

The effectiveness of this process has been demonstrated on a wide variety of waste waters in the following manner.

EXAMPLES OF TABLE IV 100 ml. samples of the suspension to be tested were placed in each of several 100 ml. stoppered graduated cylinders. Appropriate amounts of 1% aqueous solutions of surfactant of Ex. 5, Table III were added to the cylinders and the contents mixed well by hand shaking. The stoppered cylinders were allowed to stand at the appropriate temperature and the amount of settling compared with a sample in a cylinder containing no additive. Observations were made on the rate of settling, the clarity of the supernatant liquid, and the ultimate compaction of the settled solids. Note that the surfactant was added in these examples to the effluent heated above its cloud point.

Agglomeration was effected on the systems of Table IV at the temperatures and concentrations shown.

*Table IV*

| Ex. | System | P.p.m. of Surfactant needed to agglomerate and settle | Temp., °C. |
|---|---|---|---|
| 1 | Gilsonite extraction plant wash water. | 5 | 25 |
| 2 | Wash water from tar sand extraction plant. | 2 | 25 |
| 3 | Muddy Brazos River water | 10 | 25 |
| 4 | Muddy Houston ship channel water. | 10 | 25 |
| 5 | Oil field "black" water (contains FeS). | 5 | 22 |
| 6 | Muddy pond water | 20 | 22 |
| 7 | Kansas oil field back water (FeS) | [1] 10 | 22 |
| 8 | do | 5 [1] (plus 100 p.p.m. bentonite clay and 500 p.p.m. alum). | |

[1] It should also be noted that conventional floc-forming agents such as ferrous sulfate, alum, lime, clay, etc. may be used in conjunction with the process of this invention. For example, water which was to be injected into an underground reservoir for a water flood, secondary recovery operation in a Kansas oil field contained considerable suspended solids mostly in the form of FeS. This must be removed before the water can be injected into the ground. The use of ferrous sulfate and alum in conjunction with other flocculation agents such as polyacrylates was tried with little success. It was found that the surfactant of Example 5, Table III, used at 10 p.p.m. caused agglomeration. However, in actual plant use, the best combination found was 5 p.p.m. of the surfactant of Example 5, Table III, 100 p.p.m. of a bentonitic clay, and 500 p.p.m. of alum.

The above examples are illustrative of the invention illustrating the general applicability of this invention. However, it should be understood that this invention is applicable to other suspension systems, for example in the clarification of suspensions of radioactive waste, muddy ponds and lakes, boiler cooling waters, steel mill waste waters, mine and mineral waste waters, sewerage waters, etc.

It cannot be overemphasized that the nature of the oxyalkylatable starting material containing the active hydrogen which is used in the preparation of the surfactant is not critical. Any species of such material can be employed. By proper additions of alkylene oxides, this starting material can be rendered suitable as an oxyalkylated surfactant providing the resulting surfactant is soluble in the system and exhibits a suitable cloud point.

As is quite evident, new oxyalkylated materials will be constantly developed which would be useful in this invention. It is therefore not only impossible to attempt a comprehensive catalogue of such compositions, but to attempt to describe the invention in its broader aspects in terms of specific chemical names would be too voluminous and unnecessary since one skilled in the art could by following the testing procedures described herein select the proper agent. This invention lies in the use of a suitable oxyalkylated surfactant in practicing the process of this invention and their individual composition is important only in the sense that their properties effectively carry out the process. To precisely define each specific oxyalkylated surfactant's usefulness in this invention in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of an oxyalkylated surfactant suitable for this invention by means of the evaluation tests set forth herein. In analogy to the case of a machine wherein the use of certain materials of construction or dimensions of parts would lead to no practical useful result, various materials will be rejected as inapplicable where others would be operative. I assume that no one will wish to use a useless composition or will be misled because it is possible to misapply the teachings of the present disclosure in order to do so. Thus, any oxyalkylated surfactant that can perform the function stated herein can be employed.

In summary, the process of this invention is carried out as follows:

(1) The desired temperature range of the suspension to be treated is determined.

(2) Oxyalkylated surfactants having cloud points at low concentrations in this temperature range are selected.

(3) Surfactants selected from (2) are tested on the suspension and the most effective surfactant selected by dissolving the surfactant in the liquid of the suspension and heating the suspension at least to its cloud point so that it begins to come out of solution and coagulate the finely divided solids. Equivalent procedures can also be employed, for example, adding a solution of the surfactant at a temperature below its cloud point to the suspension heated above its cloud point, and the like processes.

Having thus described my invention what I claim as new and desire to obtain by Letters Patent is

1. A method of agglomerating finely divided solids in an aqueous medium characterized by causing a polyalkyleneoxy chain surfactant introduced in minor amounts into a finely divided solid-liquid system, said system including an aqueous medium, to become insoluble therein.

2. A method of agglomerating finely divided solids in an aqueous medium characterized by dissolving a minor amount of a polyalkyleneoxy chain surfactant in a finely divided solid-liquid system, said system including an aqueous medium, and heating said system to at least the cloud point of the surfactant.

3. A method of agglomerating finely divided solids in an aqueous medium characterized by adding a minor amount of a polyalkyleneoxy chain surfactant to a finely divided solid-liquid system, said system including an aqueous medium, the temperature of said system being at or above the cloud point of the polyalkyleneoxy chain surfactant.

4. A method of removing finely divided solids from an aqueous medium characterized by causing a polyalkyleneoxy chain surfactant introduced in minor amounts into a finely divided solid-liquid system, said system including an aqueous medium, to become insoluble therein so as to agglomerate said solids, and subsequently removing said agglomerated solids from the system.

5. A method of removing finely divided solids from an aqueous medium characterized by dissolving a minor amount of a polyalkyleneoxy chain surfactant in a finely divided solid-liquid system, said system including an aqueous medium, heating said system to at least the cloud point of the surfactant so as to agglomerate said solids, and subsequently removing said agglomerated solids from the system.

6. A method of removing finely divided solids from an aqueous medium characterized by adding a minor amount of a polyalkyleneoxy chain surfactant to a finely divided solid-liquid system, said system including an aqueous medium, the temperature of said system being at or above the cloud point of the polyalkyleneoxy chain surfactant so as to agglomerate the said solids, and subsequently removing said agglomerated solids from the system.

7. A method of agglomerating finely divided solids in an aqueous medium characterized by causing a polyalkylene oxide, the molecular weight of said polyalkylene oxide ranging from 500 to 100,000, introduced in minor amounts into a finely divided solid-liquid system, said system including an aqueous medium, to become insoluble therein.

8. A method of agglomerating finely divided solids in an aqueous medium characterized by dissolving a minor amount of a polyalkylene oxide, the molecular weight of said polyalkylene oxide ranging from 500 to 100,000, in a finely divided solid-liquid system, said system including an aqueous medium, and heating said system to at least the cloud point of the polyalkylene oxide.

9. A method of agglomerating finely divided solids in an aqueous medium characterized by adding a minor amount of a polyalkylene oxide, the molecular weight of said polyalkylene oxide ranging from 500 to 100,000, to a finely divided solid-liquid system, said system including an aqueous medium, the temperature of said system being at or above the cloud point of the polyalkylene oxide.

10. A method of removing finely divided solids from an aqueous medium characterized by causing a polyalkylene oxide, the molecular weight of said polyalkylene oxide ranging from 500 to 100,000, introduced in minor amounts into a finely divided solid-liquid system, said system including an aqueous medium, to become insoluble therein so as to agglomerate said solids, and subsequently removing said agglomerated solids from the system.

11. A method of removing finely divided solids from an aqueous medium characterized by dissolving a minor amount of a polyalkylene oxide, the molecular weight of said polyalkylene oxide ranging from 500 to 100,000, in a finely divided solid-liquid system, said system including an aqueous medium, heating said system to at least the cloud point of the polyalkylene oxide so as to agglomerate said solids, and subsequently removing said agglomerated solids from the system.

12. A method of removing finely divided solids from an aqueous medium characterized by adding a minor amount of a polyalkylene oxide, the molecular weight of said polyalkylene oxide ranging from 500 to 100,000, to a finely divided solid-liquid system, said system including an aqueous medium, the temperature of said system being at or above the cloud point of the polyalkylene oxide so as to agglomerate the said solids, and subsequently removing said agglomerated solids from the system.

References Cited by the Examiner
UNITED STATES PATENTS

| | | | |
|---|---|---|---|
| 2,261,924 | 11/41 | Pittman et al. | 210—56 |
| 2,415,439 | 2/47 | Nelson | 210—56 X |
| 2,701,239 | 2/55 | Ryznar | 210—56 X |
| 2,882,250 | 4/59 | Baker. | |
| 2,942,978 | 6/60 | Segel et al. | 210—54 X |
| 2,963,483 | 12/60 | Heywood | 210—54 X |
| 2,978,344 | 4/61 | Parker et al. | 210—56 X |
| 3,020,231 | 2/62 | Colwell et al. | 210—54 X |
| 3,032,577 | 5/62 | Morehouse | 210—54 X |

OTHER REFERENCES

"Polyox Coagulant—A New Organic Flocculating Agent," Advance Technical Information publication of Union Carbide Chemicals Co., F-40340, August 1960, 4 pp. general matter, 1 p. chart and 11 pp. appendix, 16 pp. in all, Union Carbide Chemicals Co., 270 Park Ave., New York 17, N.Y.

"Polyox," Bailey et al., Ind. & Eng. Chem., vol. 50, January 1958, pp. 8–11.

Surface Active Agents and Detergents, vol. II, by Schwartz et al., Interscience Publishers Inc., New York (Jan. 23, 1958), pages 120 to 129, 164, 165 and 487.

MORRIS O. WOLK, *Primary Examiner.*

EARL M. BERGERT, *Examiner.*